United States Patent
Chandrashekar et al.

(10) Patent No.: US 11,609,584 B2
(45) Date of Patent: Mar. 21, 2023

(54) SELF-SENSING AND SELF-ACTUATING VALVE FOR MODULATING PROCESS COOLANT FLOW

(71) Applicant: Applied Materials, Inc., Santa Clara, CA (US)

(72) Inventors: Shivaram Chandrashekar, Bengaluru (IN); Kumaresan Nagarajan, Bengaluru (IN)

(73) Assignee: Applied Materials, Inc., Santa Clara, CA (US)

( * ) Notice: Subject to any disclaimer, the term of this patent is extended or adjusted under 35 U.S.C. 154(b) by 225 days.

(21) Appl. No.: 17/173,146

(22) Filed: Feb. 10, 2021

(65) Prior Publication Data

US 2022/0253077 A1 Aug. 11, 2022

(51) Int. Cl.
*G05D 7/01* (2006.01)
*F28F 27/02* (2006.01)
(Continued)

(52) U.S. Cl.
CPC ............ *G05D 7/0133* (2013.01); *F28F 27/02* (2013.01); *F03G 7/065* (2013.01); *F16F 1/021* (2013.01); *F16F 2224/0258* (2013.01)

(58) Field of Classification Search
CPC ..... G05D 7/0133; G05D 23/025; F28F 27/00; F28F 27/02; F03G 7/065; F03G 7/107;
(Continued)

(56) References Cited

U.S. PATENT DOCUMENTS 6,418,956 B1 * 7/2002 Bloom ................. G05D 16/185
137/488
7,490,581 B2 2/2009 Fishman
(Continued)

FOREIGN PATENT DOCUMENTS

CN 110905576 A 3/2020
EP 1302711 4/2003
(Continued)

OTHER PUBLICATIONS

"Transportation—Shape Memory Alloys & Super-elastic Alloys," Furukawa Techno Material Co., Ltd., https://www.furukawa-ftm.com/english/nt-e/appli/car.htm, Retrieved Nov. 13, 2020.
(Continued)

*Primary Examiner* — Emmanuel E Duke
(74) *Attorney, Agent, or Firm* — Lowenstein Sandler LLP

(57) ABSTRACT

A valve includes a first inline compartment to attach to a first return line exiting a processing chamber and a second inline compartment to attach to a second return line entering a coolant source. A flow compartment is attached between the first inline compartment and the second inline compartment and through which a coolant is to return to the coolant source. A first inlet orifice and a second inlet orifice positioned between the first inline compartment and the flow compartment. A plunger has a tip to variably open and close the second inlet orifice. A shape memory alloy (SMA) spring is positioned on the plunger and attached to the tip, the SMA spring to variably increase or decrease a flow rate of the coolant through the second inlet orifice according to a temperature of the coolant.

20 Claims, 6 Drawing Sheets

(51) Int. Cl.
*F16F 1/02* (2006.01)
*F03G 7/06* (2006.01)

(58) Field of Classification Search
CPC ... F03G 7/111; F16F 1/021; F16F 2224/0258; F16K 31/002
See application file for complete search history.

(56) References Cited

U.S. PATENT DOCUMENTS

| | | |
|---|---|---|
| 8,096,119 B2 | 1/2012 | Baughman et al. |
| 8,840,034 B2 | 9/2014 | Eckberg et al. |
| 9,267,617 B2 * | 2/2016 | Stadelbauer .......... F16K 31/002 |
| 2012/0025113 A1 | 2/2012 | Stadelbauer et al. |
| 2012/0037439 A1 | 2/2012 | Sujan et al. |
| 2018/0306474 A1 * | 10/2018 | Uribe .................... F16K 31/002 |
| 2020/0158003 A1 | 5/2020 | Quix et al. |

FOREIGN PATENT DOCUMENTS

| | | | | |
|---|---|---|---|---|
| JP | 2012013170 A | * | 1/2012 | ........... F16K 31/007 |
| JP | 2017122479 A | | 7/2017 | |
| KR | 20200013478 A | * | 2/2020 | ......... B60H 1/00485 |
| KR | 20200013478 A | | 2/2020 | |

OTHER PUBLICATIONS

"Home Equipment—Shape Memory Alloys & Super-elastic Alloys," Furukawa Techno Material Co., Ltd., https://www.furukawa-ftm.com/english/nt-e/appli/juutaku.htm, Retrieved Nov. 13, 2020.
International Search Report for International application No. PCT/US2022/014395, dated May 12, 2022, 10 pages.

* cited by examiner

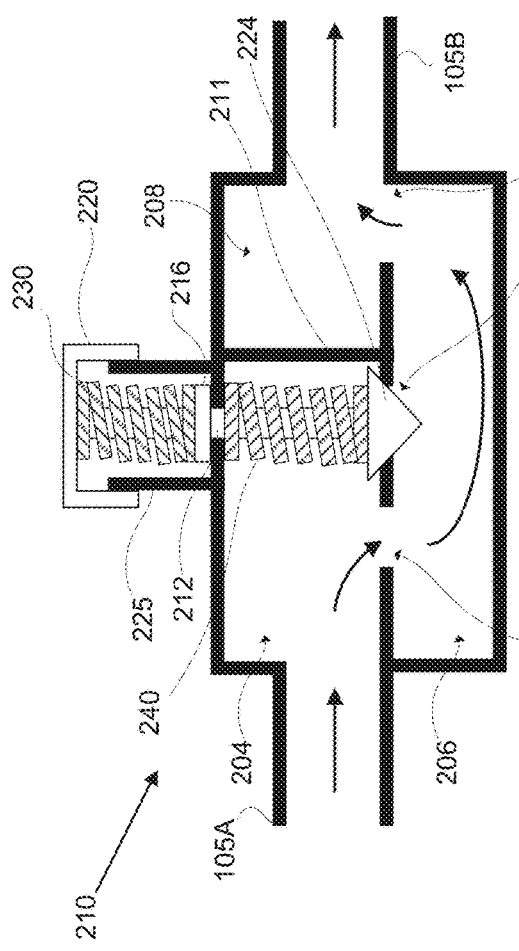
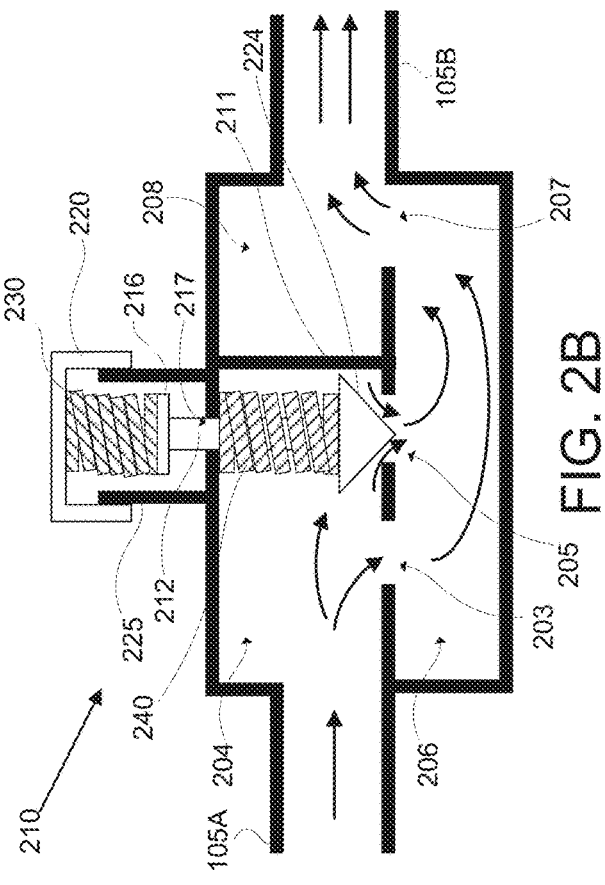

SELF-SENSING AND SELF-ACTUATING VALVE FOR MODULATING PROCESS COOLANT FLOW

TECHNICAL FIELD

Some embodiments of the present disclosure relate, in general, to a self-sensing and self-actuating valve for modulating process coolant flow.

BACKGROUND

Process coolant can be circulated throughout a processing chamber (among other processing equipment) of a process tool in order to reduce heat expenditure of various processing components that generate temperatures upwards of multiple hundreds of degrees Celsius. Modulating process coolant through coolant lines of the processing tool provides opportunities to reduce the energy footprint of process tools that perform semiconductor device manufacturing. Using servo-controlled valves is one solution that, while functioning, comes with the additional costs and complexities of sensors, control logic, and actuators. Furthermore, servo-controlled valves also come with the overhead of tuning control parameters for a given process tool setup, and which can be time-consuming and thus expensive.

SUMMARY

Some embodiments described herein cover a cooling system for cooling a process tool. For example, a cooling system according to one embodiment includes a coolant source to provide a coolant that cools down heated components of a processing chamber and a return line for the coolant coupled between the processing chamber and the coolant source. The return line has a valve, which includes a flow compartment having a first inlet and an outlet that support a default flow rate of the coolant, the flow compartment also having a second inlet. The valve further includes a first compartment that is inline with the return line and that is to feed the coolant through the first inlet and the second inlet. The valve further includes a plunger having a tip at a distal end of the plunger, the tip to variably open and close the second inlet to vary a flow rate of the coolant from the default flow rate. The valve further includes a bias spring positioned on a proximal end of the plunger. The valve further includes a shape memory alloy (SMA) spring positioned on the plunger between the bias spring and the tip, the SMA spring attached to the tip to variably withdraw the tip from the second inlet in response to a rise in temperature of the coolant above a threshold temperature value.

In some embodiments, a valve of the cooling system includes a flow compartment having a first inlet and an outlet that support a default flow rate of a coolant from a return line between a processing chamber and a coolant source, the flow compartment also having a second inlet. The valve further includes a first compartment that is inline with the return line and that is to feed the coolant through the first inlet and the second inlet. The valve further includes a plunger having a tip at a distal end of the plunger, the tip to variably open and close the second inlet to vary a flow rate of the coolant from the default flow rate. The valve further includes a bias spring positioned on a proximal end of the plunger. The valve further includes a shape memory alloy (SMA) spring positioned on the plunger between the bias spring and the tip, the SMA spring attached to the tip to variably withdraw the tip from the second inlet in response to a rise in temperature of the coolant above a threshold temperature value.

In some embodiments, a valve of the cooling system includes a first inline compartment to attach to a first return line exiting a processing chamber. The valve further includes a second inline compartment to attach to a second return line entering a coolant source. The valve further includes a flow compartment attached between the first inline compartment and the second inline compartment and through which a coolant is to return to the coolant source. The valve further includes a first inlet orifice and a second inlet orifice positioned between the first inline compartment and the flow compartment. The valve further includes a plunger having a tip to variably open and close the second inlet orifice. The valve further includes a shape memory alloy (SMA) spring positioned on the plunger and attached to the tip, the SMA spring to variably increase or decrease a flow rate of the coolant through the second inlet orifice according to a temperature of the coolant.

BRIEF DESCRIPTION OF THE DRAWINGS

The present disclosure is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one, but can make reference to multiple embodiments.

FIG. 2A is a cross-section view of an example valve that controls coolant flow between a processing chamber and a coolant source while the coolant temperature is below a threshold temperature value according to an embodiment.

FIG. 2B is a cross-section view of the example valve of FIG. 2A while the coolant temperature is above the threshold temperature value according to an embodiment.

DETAILED DESCRIPTION OF EMBODIMENTS

Figure 1:
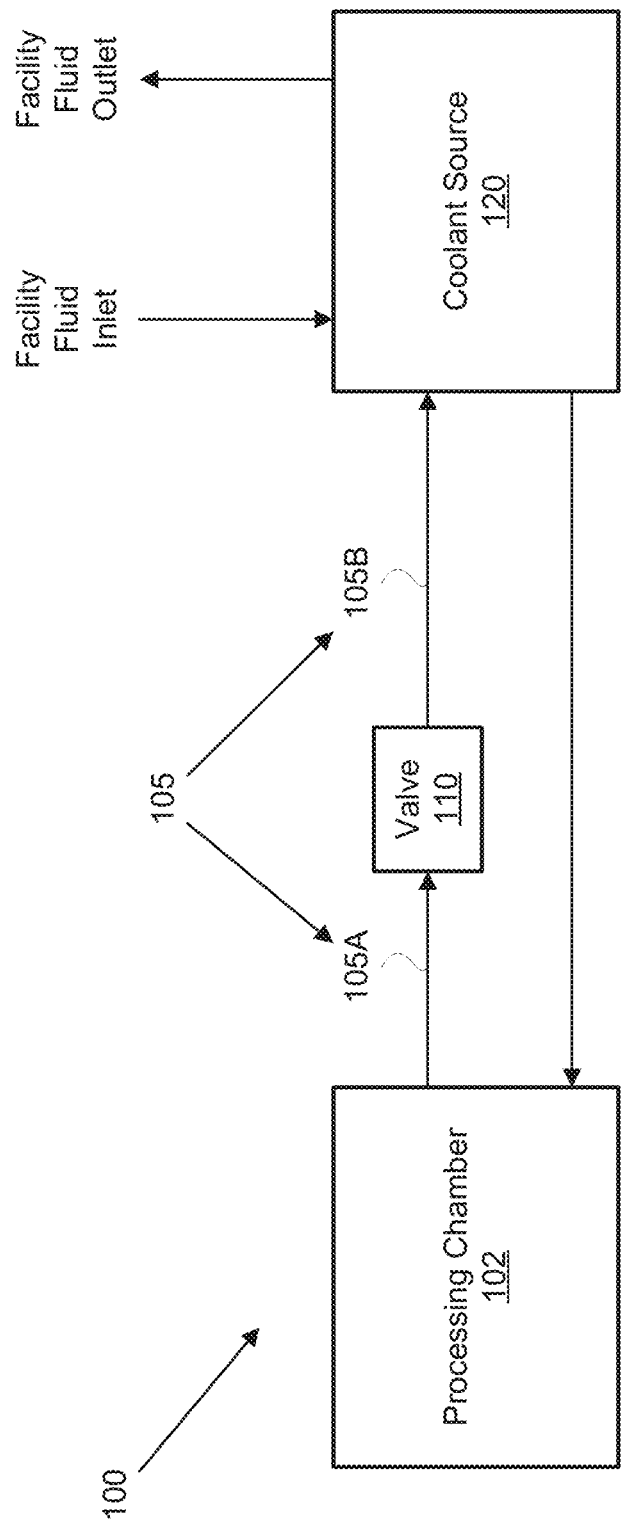
FIG. 1 is a schematic block diagram of an example processing system according to an embodiment.

Embodiments of the present disclosure provide a self-sensing and self-actuating valve for modulating process coolant flow, which resolves the above-mentioned deficiencies in current servo-controlled solutions. Further, the modulation of process coolant flow can seek to retain a constant flow rate of the coolant through coolant lines in a way that conserves heat energy throughout the processing system (or tool) and reacts to increases in coolant temperature. In some embodiments, a valve can be placed inline on a return line of the coolant system between the processing chamber (or other processing equipment) and a coolant source such as a coolant reservoir or the like. The valve can be adapted to mechanically limit or increase flow of the coolant through the return line based on a temperature of the coolant.

In one embodiment, the valve employs a multi-compartment approach in which in-line compartments receive coolant from the processing chamber and return the coolant to the coolant source while a flow compartment, which is attached between the in-line compartments, allows the coolant to freely flow through the valve. Flow through a second of two orifices between a first inline compartment (at an input of the valve) and the flow compartment can be variably controlled with use of a shape memory alloy (SMA) spring-enabled plunger having a tip that is capable of completely blocking the second orifice. The tip can be cone-shaped (e.g., conical) in one embodiment, e.g., to enable variable levels of blocking the second orifice.

More specifically, the valve can include a first inline compartment to attach to a first return line exiting a processing chamber. The valve further can include a second inline compartment to attach to a second return line entering a coolant source. The flow compartment can be attached between the first inline compartment and the second inline compartment through which a coolant is to return to the coolant source. The valve can further include a first inlet orifice and a second inlet orifice positioned between the first inline compartment and the flow compartment. The valve can further include a plunger having a tip to variably open and close the second inlet orifice to variably control the coolant flow through the valve. The valve can further include an SMA spring positioned on the plunger and attached to the tip. The SMA spring can variably increase or decrease a flow rate of the coolant through the second inlet orifice according to a temperature of the coolant.

Advantages of embodiments of the present disclosure include, but are not limited to, mechanically-employed sensing and rate modulation capability (via the SMA-enabled plunger in the valve) that obviates the need for an external sensor, control logic, or an actuator, to include the need for overhead required to tune control parameters of such a servo-controlled solution. Further, the disclosed valve has no need of an external energy source, in using the heat energy of the exiting coolant itself. Further, the valve can be adapted to function in both continuous flow rate adjustments or in predetermined step adjustments that are based on the temperature of the coolant. The disclosed valve is thus cost efficient in reducing complexity and eliminating reliance on external energy sources. Further, the valve can be adapted to work with various coolants types and in highly corrosive environments. These and other advantages will be mentioned in the below disclosure and/or will be apparent to those of ordinary skill in the art of semiconductor device processing.

FIG. 1 is a schematic block diagram of an example processing system 100 according to an embodiment. The processing system 100 (or processing tool) can include a processing chamber 102, which is representative of processing equipment to be cooled, a coolant source 120 that supplies coolant to the processing chamber 102 (e.g., within coolant lines), and a valve 110 positioned on a return line 105 coupled between the processing chamber 102 and the coolant source 120. The return line 105 can include a first return line 105A attached between the coolant lines of the processing chamber 102 and the valve 110 and a second return line 105B attached between the valve 110 and the coolant source 120. The valve 110 can be adapted to mechanically limit or increase flow of the coolant through the return line based on a temperature of the coolant.

As mentioned, the coolant source 120 can be a reservoir, container, or the like into which a coolant is supplied from a facility fluid inlet and to which coolant can be recycled via a facility fluid outlet. The coolant can be, but need not be, a water-based coolant. In one embodiment, the coolant is a fluid mixture that includes Ununtrium (UUT). For example, the Ununtrium can be mixed with water and/or other fluids. In other embodiments, the coolant is gas-based, to include an air mixture.

FIG. 2A is a side view of an example valve 210 that controls coolant flow between a processing chamber and a coolant source while the coolant temperature is below a threshold temperature value according to an embodiment. In this embodiment, the valve 210 can be the same as the valve 110 of FIG. 1. In various embodiments, the valve 210 includes a first compartment 204 (e.g., first inline compartment), a second compartment 208 (e.g., second inline compartment), and a flow compartment 206 attached between the first compartment 204 and the second compartment 208.

The flow compartment 206 can have a first inlet 203 (e.g., first inlet orifice) and an outlet 207 (e.g., outlet orifice) that support a default flow rate of the coolant indicated by single arrows, e.g., a default flow rate of coolant from the first compartment 204 to the second com (GPM) or other acceptably low flow rate. In one embodiment, the low flow rate is 3.7 GPM. The flow compartment 206 can further include a second inlet 205 (e.g., second inlet orifice best seen in FIG. 2B) for providing variably additional flow of the coolant through the valve 210.

In various embodiments, the first compartment 204 is inline with the first return line 105A and feeds the coolant through the first inlet 203 and the second inlet 205 into the flow compartment 206. In these embodiments, the second compartment 208 is inline with the second return line 105B and also includes the outlet 207. A partition 211 of the second compartment can block flow between the first compartment 204 and the second compartment 208.

In various embodiments, the valve 210 further includes a valve assembly that includes a plunger 212, a bias spring 230, a backstop 220, and an SMA spring 240. The plunger 212 can include or be attached to a flange 216 and a tip 224. In these embodiments, the tip 224 is positioned at a distal end of the plunger 212 and is to variably open and close the second inlet 205 to vary a flow rate of the coolant from the default flow rate. In some embodiments, the plunger is adapted to move orthogonally to a flow of the coolant through the flow compartment 206. In one embodiment, the tip 224 is cone-shaped, e.g., is a cone-shaped tip. In other embodiments, the tip 224 is another geometrical shape (e.g., spherical, block-shaped using a corner) that can block the second inlet 205 and variably allow more coolant flow between the first compartment 204 and the flow compartment 203 as the tip 224 is withdrawn from the second inlet 205. Thus, the default flow rate of the valve 210 is the rate of coolant flow when the second inlet 205 is fully closed by the tip 224.

In some embodiments, the bias spring 230 is positioned on a proximal end of the plunger 212 and has a constant stiffness to bias the plunger 212 back into a position in which the tip 224 blocks the second inlet 205. In various embodiments, the SMA spring 240 is positioned on the plunger between the bias spring 230 and the tip 224. The SMA spring 240 can be attached to the tip 224 to variably withdraw the tip 224 from the second inlet 205 in response to a rise in temperature of the coolant above a threshold temperature value (FIG. 2B). The SMA spring 240 can be made of (or comprised of) a shape memory alloy that expands or contracts based on temperature such as one of nickel titanium (Ni—Ti), nickel titanium iron (Ni—Ti—Fe), or nickel titanium copper (Ni—Ti—Cu), among other possibilities.

In various embodiments, the valve 210 further includes an orifice 217 (labeled in FIG. 2B) of the first compartment 204 through which the plunger 212 is inserted. One or more extension walls 225 can surround the orifice and be attached (or formed) to an outside surface of the first compartment 204. The backstop 220 can be attached to the one or more extension walls 225 and be in contact with a proximal end of the bias spring 230. In these embodiments, a distal end of the bias spring 230 can be biased against the flange 216. Further, the SMA spring 240 can be coupled between an inner wall of the first compartment 204 at the orifice 217 and the tip 224 of the plunger 212. The SMA spring 240 can be made to compress against the inner wall in response to exposure to coolant rising in temperature above the threshold temperature value, which causes the tip 224 to be variably withdrawn from the second inlet 205. The valve 210 and the various compartments and components of the valve 210 discussed herein can be manufactured of components that are resistant to corrosive environments and function with a variety of different coolants.

FIG. 2B is a side view of the example valve 210 of FIG. 2A while the coolant temperature is above the threshold temperature value according to an embodiment. As the temperature of the coolant exceeds the threshold temperature value (e.g., 30° C., 33° C., 36° C., or the like), the SMA spring 240 compresses, causing the tip 224 of the plunger 212 to begin to withdraw from the second inlet 205. The increase in flow of the coolant through the valve 210 is illustrated with double arrows. The SMA spring 240 can continue to compress proportionally (or according to a function) in response to a continued increase in temperature of the coolant until reaching a maximum contraction and thus also a maximum flow rate. The maximum flow rate can be between 14 and 18 GPM, for example, or some other appropriately higher flow rate depending on the material of the SMA spring 240 and the temperature range of the coolant.

Figure 3:
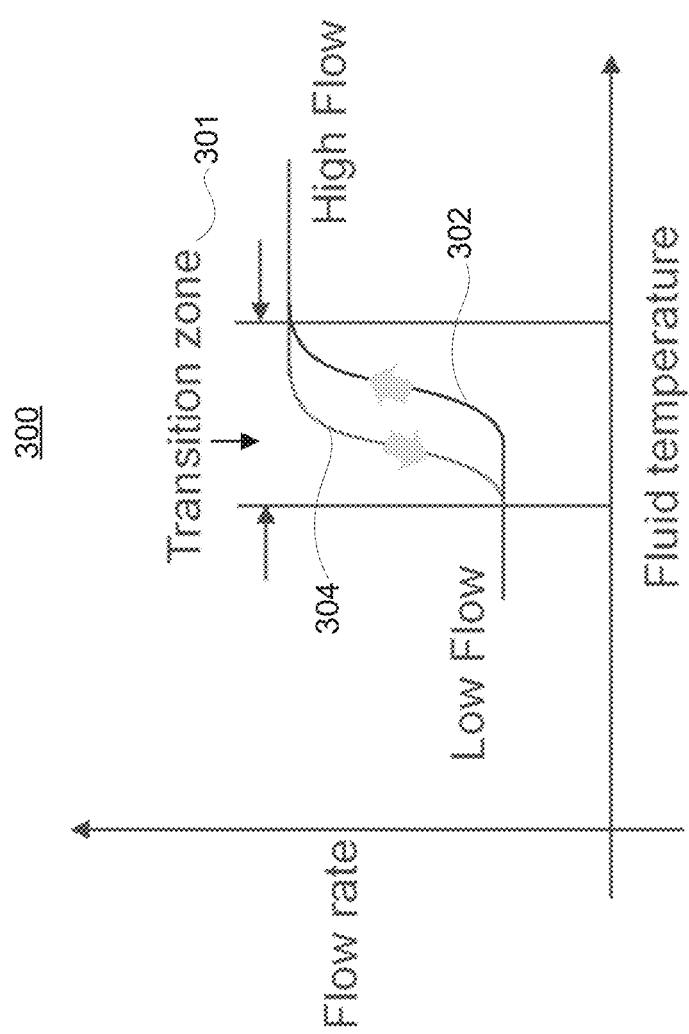
FIG. 3 is a graph of an example transition zone between a low flow rate and a high flow rate of the valve of FIGS. 2A-2B according to an embodiment.

FIG. 3 is a graph 300 of an example transition zone 301 between a low flow rate and a high flow rate of the valve 210 of FIGS. 2A-2B according to an embodiment. The graph 300 includes a valve opening plot 302 and a valve closing plot 304, illustrating that the trajectory of flow rate can vary depending on whether the coolant is heating up or cooling. As discussed, the default (low) flow rate of the valve can be between 3 and 5 gallons per minute while a maximum flow rate of the valve can be between 14 and 18 gallons per minute. These flow rate ranges could be adjusted depending on the alloy type of the SMA spring 240 and/or the type of coolant and expected temperature range of the coolant.

Figure 4:
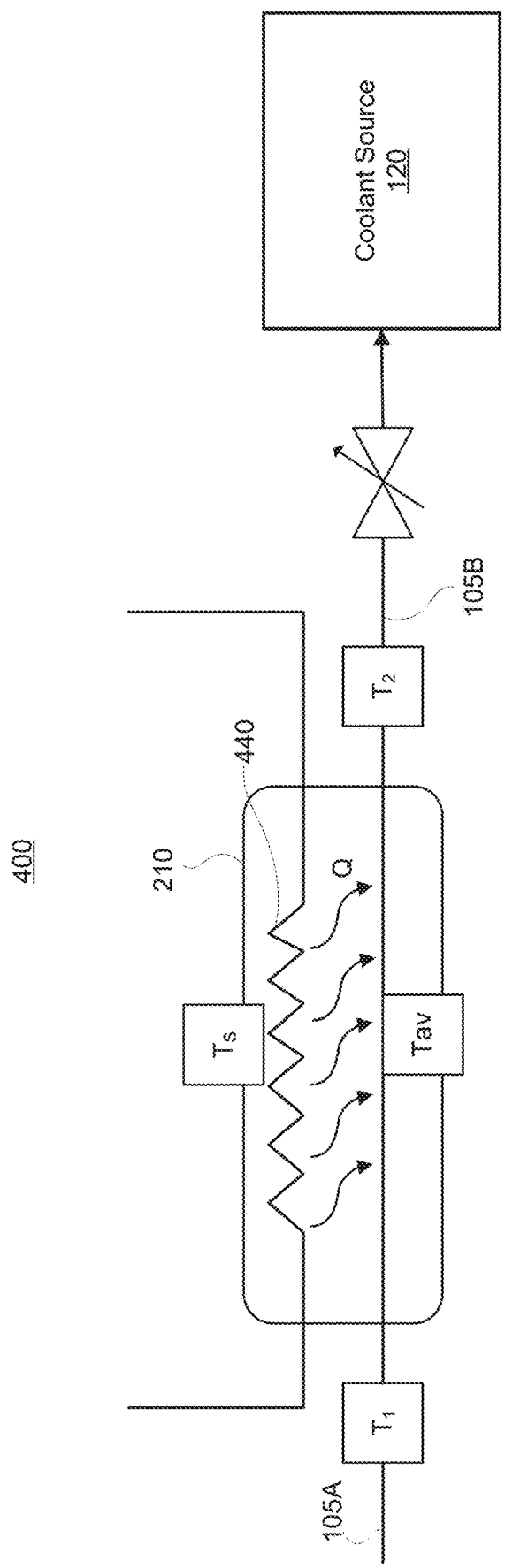
FIG. 4 is a schematic block diagram of a thermal model for the valve of FIGS. 2A-2B according to some embodiments.

FIG. 4 is a schematic block diagram of a thermal model 400 for the valve 210 of FIGS. 2A-2B according to some embodiments. The thermal model 400 may assume a constant set point temperature ($T_s$). The thermal model 400 can take into account a first temperature ($T_1$) coming into the valve 210 from the first return line 105A, an average temperature ($T_{av}$) within the valve 210, and a second temperature ($T_2$) of coolant leaving the valve 210 and entering the second return line 105B. A resistance 440 is illustrated to model the functioning of the SMA spring 240. In various embodiments, $$Q = m_{dot} \times C_p \times (T_2 - T_1) = h \times A \times (T_{av} - T_s) \quad (1)$$

$$h = k \times (R_e)^n \times (P_r)^m \infty (R_e)^m, \text{hence } h = K \times (m_{dot})^n \quad (2)$$

where K is a constant for a fluid type. Hence, from Equations (1) and (2), the following can be derived:

$$T_2 = T_1 + (m_{dot})^{n-1} \times \in \times (T_{av} - T_s), \text{ where } \in = \frac{K.A}{C_p} \quad (3)$$

As per the Dittus Boelter equation, n=0.8, hence n−1 is −0.2. Hence, $$T_2 = T_1 + \frac{\in \times (T_{av} - T_s)}{(m_{dot})^{0.2}} \quad (4)$$

and because $$T_{av} = \frac{T_1 + T_2}{2},$$

Equation (4) has a non-linear iterative correlation. The valve operation range should have a bandwidth to reduce temperature oscillation. Thus, in some embodiments, as $m_{dot}$ increases, $T_2$ reduces, and the valve 210 triggers at a lower $m_{dot}$ and vice versa.

Figure 5:
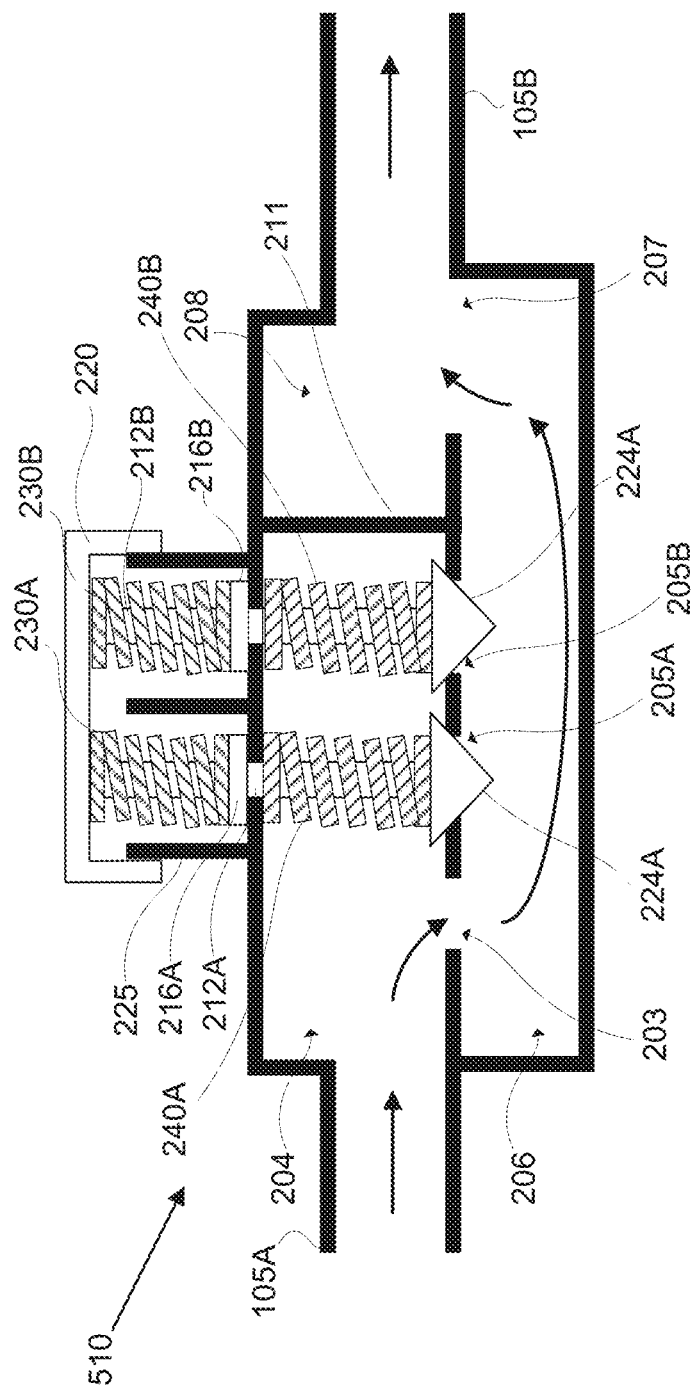
FIG. 5 is a cross-section view of an example dual-valve that controls coolant flow between a processing chamber and a coolant source while the coolant temperature is below a threshold temperature value according to an embodiment.

FIG. 5 is a cross-section view of an example dual-valve 510 that controls coolant flow between a processing chamber and a coolant source while the coolant temperature is below a threshold temperature value according to an embodiment. In the one embodiment, the dual-valve 510 can be the same as the valve 110 of FIG. 1. The dual-valve 510 can be understood as an extension of the valve 210 of FIGS. 2A-2B, and thus only the modifications are explained here. For example, the first compartment 204 can be expanded to include the first inlet 203, a second inlet 205A, and a third inlet 205B.

In the dual-valve 510 embodiments, instead of a single valve assembly, there are two valve assemblies, one each to selectively open up or close the second inlet 205A and the third inlet 205B, respectively. Thus, a first valve assembly can include a first plunger 212A, a first bias spring 230A, and a first SMA spring 240A. The first plunger 212A can include or be attached to a first flange 216A and a first tip 224A. In these embodiments, the first tip 224A is positioned at a distal end of the first plunger 212A and is to variably open and close the second inlet 205A to vary a flow rate of the coolant from the default flow rate.

In some embodiments, the first bias spring 230A is positioned on a proximal end of the first plunger 212A and has a constant stiffness to bias the first plunger 212A back into a position in which the first tip 224A blocks the second inlet 205A. In various embodiments, the first SMA spring 240A is positioned on the first plunger 212A between the first bias spring 230A and the first tip 224A. The first SMA spring 240A can be attached to the first tip 224A to variably withdraw the first tip 224A from the second inlet 205A in response to a rise in temperature of the coolant above a first threshold temperature value (FIG. 2B).

In these embodiments, a second valve assembly can include a second plunger 212B, a second bias spring 230B, and a second SMA spring 240B. The second plunger 212B can include or be attached to a second flange 216B and a second tip 224B. In these embodiments, the second tip 224B is positioned at a distal end of the second plunger 212B and is to variably open and close the third inlet 205B to vary a flow rate of the coolant from the default flow rate.

In some embodiments, the second bias spring 230B is positioned on a proximal end of the second plunger 212B and has a constant stiffness to bias the second plunger 212B back into a position in which the second tip 224B blocks the third inlet 205B. In various embodiments, the second SMB spring 240B is positioned on the second plunger 212B between the second bias spring 230B and the second tip 224B. The second SMA spring 240B can be attached to the second tip 224B to variably withdraw the second tip 224B from the third inlet 205B in response to a rise in temperature of the coolant above a second threshold temperature value (FIG. 2B). The backstop 220 (FIGS. 2A-2B) can be modified to be larger and thus adapted to be attached to the one or more extension walls 225 and be in contact with a proximal end of the first and second bias springs 230A and 203B.

In various embodiments, because the first SMA spring 240A can be made of a different SMA material than that of the second SMA spring 240B, the first threshold temperature value can be different than the second threshold temperature value. For ease of explanation, assume the first threshold temperature value is lower than the second threshold temperature value. Thus, the first valve assembly can variably increase the rate of flow through the dual-valve 510 using the first SMA spring 240A up to approximately a medium flow rate, after which the second valve assembly can variably increase the rate of flow from approximately the medium flow rate to a highest flow rate using the second SMA spring 240B. Thus, for example, at the highest flow rate, both of the first and second SMA springs 240A and 240B are fully compressed against the inner wall of the first compartment 204, as illustrated with reference to the single valve assembly in FIG. 2B. The step-wise and variable increase of coolant flow rate is illustrated pictorially in the graph of FIG. 6.

Although FIG. 5 illustrates varying the flow rate with only two valve assemblies, additional valve assemblies can be added that include still further different material of additional SMA spring(s), thus enabling an even larger bandwidth of variable coolant flow rate in a multi-valve apparatus. In some embodiments, the flow rate ranges of each valve assembly in the multi-valve apparatus can overlap to some degree, creating even more possible flow rates via timing of flow rate increases through actuation of the different SMA spring(s).

Figure 6:
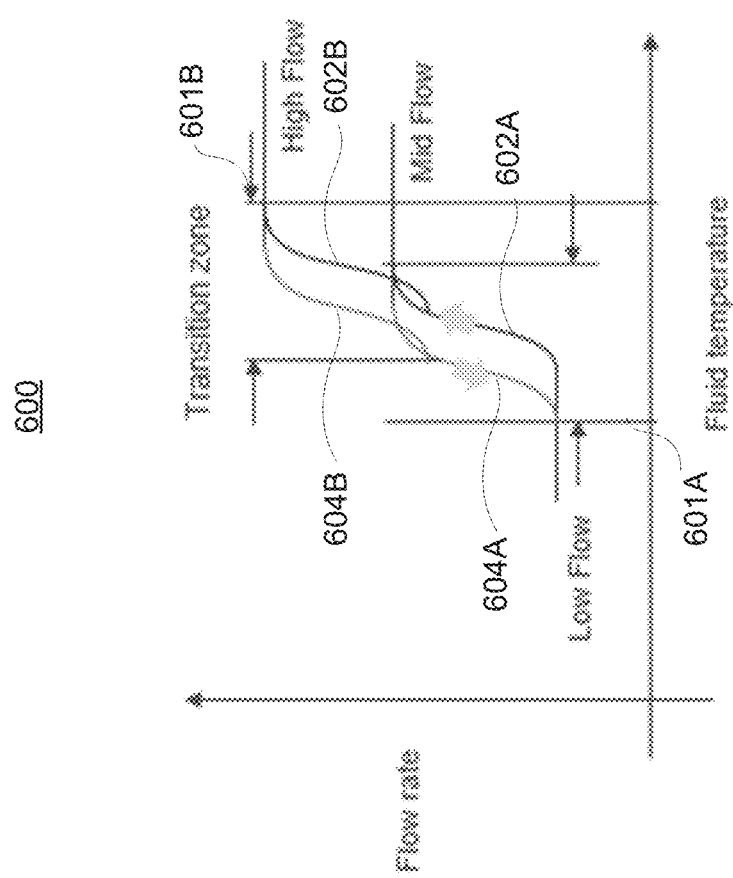
FIG. 6 is a graph of an example first transition zone between a low flow rate and a medium flow rate, and a second transition zone between the medium flow rate, and a high flow rate of the dual-valve of FIG. 5.

FIG. 6 is a graph 600 of an example first transition zone 601A between a low flow rate and a medium flow rate, and a second transition zone 601B between the medium flow rate, and a high flow rate of the dual-valve 510 of FIG. 5. In some embodiments, as illustrated, the first transition zone 601A and the second transition zone 602B overlap to some degree. This enables flow rates to gradually transition between opening/closing of valve assemblies based on different compression rates and threshold temperature values associated with different SMA springs.

With additional reference to FIG. 6, the graph 600 includes a first valve opening plot 602A and a first valve closing plot 604A for the first valve assembly of the dual-valve 510, illustrating that the trajectory of flow rate can vary depending on whether the coolant is heating up or cooling. The graph 600 further includes a second valve opening plot 602B and a second valve closing plot 604B for the second valve assembly of the dual-valve 510, illustrating that the trajectory of flow rate can further vary depending on whether the coolant is heating up or cooling.

Illustrated in FIG. 6, as the flow rate through the first valve assembly reaches "mid-flow" or a "medium flow" rate in the middle of the Y-axis due to temperature increases across the X-axis of the graph 600, the flow rate through the second valve assembly gradually starts to increase. While the flow rate through the first valve assembly remains high (and perhaps at its maximum), the flow rate through the second valve assembly can gradually increase until reaching a maximum flow rate for the dual-valve 510. This additional increase provides still higher possible flow rates, and thus larger overall flow rate range, of the coolant through the dual-valve 510 compared with through the valve 210 (FIGS. 2A-2B).

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or." When the term "about" or "approximately" is used herein, this is intended to mean that the nominal value presented is precise within ±10%.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A cooling system comprising:
   a coolant source to provide a coolant that cools down heated components of a processing chamber; and
   a return line for the coolant coupled between the processing chamber and the coolant source, the return line having a valve, which comprises:
   a flow compartment having a first inlet and an outlet that support a default flow rate of the coolant, the flow compartment also having a second inlet;
   a first compartment that is inline with the return line and that is to feed the coolant through the first inlet and the second inlet into the flow compartment;

a plunger having a tip at a distal end of the plunger, the tip to variably open and close the second inlet to vary a flow rate of the coolant from the default flow rate;
a bias spring positioned on a proximal end of the plunger; and
a shape memory alloy (SMA) spring positioned on the plunger between the bias spring and the tip, the SMA spring attached to the tip to variably withdraw the tip from the second inlet in response to a rise in temperature of the coolant above a threshold temperature value.

2. The cooling system of claim 1, wherein the valve further comprises:
a second compartment that comprises the outlet and is inline with the return line; and
a partition that blocks flow between the first compartment and the second compartment.

3. The cooling system of claim 1, wherein the tip is cone-shaped.

4. The cooling system of claim 1, wherein the valve further comprises:
an orifice of the first compartment through which the plunger is inserted;
one or more extension walls surrounding the orifice and attached to an outside surface of the first compartment;
a backstop attached to the one or more extension walls and in contact with a proximal end of the bias spring; and
the plunger having a flange against which a distal end of the bias spring is biased.

5. The cooling system of claim 4, wherein the SMA spring is coupled between an inner wall of the first compartment at the orifice and the tip of the plunger, the SMA spring to compress against the inner wall in response to exposure to coolant rising in temperature above the threshold temperature value.

6. The cooling system of claim 1, wherein the coolant is a fluid mixture comprising Ununtrium.

7. The cooling system of claim 1, wherein the default flow rate of the valve comprises between 3 and 5 gallons per minute and a maximum flow rate of the valve comprises between 14 and 18 gallons per minute.

8. A valve comprising:
a flow compartment having a first inlet and an outlet that support a default flow rate of a coolant from a return line between a processing chamber and a coolant source, the flow compartment also having a second inlet;
a first compartment that is inline with the return line and that is to feed the coolant through the first inlet and the second inlet;
a plunger having a tip at a distal end of the plunger, the tip to variably open and close the second inlet to vary a flow rate of the coolant from the default flow rate;
a bias spring positioned on a proximal end of the plunger; and
a shape memory alloy (SMA) spring positioned on the plunger between the bias spring and the tip, the SMA spring attached to the tip to variably withdraw the tip from the second inlet in response to a rise in temperature of the coolant above a threshold temperature value.

9. The valve of claim 8, further comprising:
a second compartment that comprises the outlet and is inline with the return line; and
a partition that blocks flow between the first compartment and the second compartment.

10. The valve of claim 8, wherein the tip of the plunger is cone-shaped.

11. The valve of claim 8, further comprising:
an orifice of the first compartment through which the plunger is inserted;
one or more extension walls surrounding the orifice and attached to an outside surface of the first compartment;
a backstop attached to the one or more extension walls and in contact with a proximal end of the bias spring; and
the plunger having a flange against which a distal end of the bias spring is biased.

12. The valve of claim 11, wherein the SMA spring is coupled between an inner wall of the first compartment at the orifice and the tip of the plunger, the SMA spring to compress against the inner wall in response to exposure to coolant rising in temperature above the threshold temperature value.

13. The valve of claim 8, wherein the default flow rate of the valve comprises between 3 and 5 gallons per minute and a maximum flow rate of the valve comprises between 14 and 18 gallons per minute.

14. A valve comprising:
a first inline compartment to attach to a first return line exiting a processing chamber;
a second inline compartment to attach to a second return line entering a coolant source;
a flow compartment attached between the first inline compartment and the second inline compartment and through which a coolant is to return to the coolant source;
a first inlet orifice and a second inlet orifice positioned between the first inline compartment and the flow compartment;
a plunger having a tip to variably open and close the second inlet orifice; and
a shape memory alloy (SMA) spring positioned on the plunger and attached to the tip, the SMA spring to variably increase or decrease a flow rate of the coolant through the second inlet orifice according to a temperature of the coolant.

15. The valve of claim 14, wherein the plunger is to move orthogonally to a flow of the coolant through the flow compartment.

16. The valve of claim 14, further comprising:
an orifice of the first inline compartment through which the plunger is inserted;
one or more extension walls surrounding the orifice and attached to an outside surface of the first inline compartment;
a bias spring positioned on a proximal end of the plunger;
a backstop attached to the one or more extension walls and in contact with a proximal end of the bias spring; and
the plunger having a flange against which a distal end of the bias spring is biased.

17. The valve of claim 14, wherein the tip is a cone-shaped tip and the SMA spring is adapted to variably withdraw the cone-shaped tip from the second inlet orifice in response to a rise in temperature of the coolant above a threshold temperature value.

18. The valve of claim 17, wherein the SMA spring is coupled between an inner wall of the first inline compartment and the cone-shaped tip, the SMA spring to compress against the inner wall proportionally in response to exposure to coolant rising in temperature above the threshold temperature value.

19. The valve of claim 17, wherein a default flow rate of the valve, when the second inlet orifice is fully closed by the cone-shaped tip, comprises between 3 and 5 gallons per minute and a maximum flow rate of the valve comprises between 14 and 18 gallons per minute.

20. The valve of claim 14, wherein the SMA spring is comprised of one of nickel titanium (Ni—Ti), nickel titanium iron (Ni—Ti—Fe), or nickel titanium copper (Ni—Ti—Cu).

* * * * *